O. A. QUALEY.
ANIMAL POKE.
APPLICATION FILED FEB. 27, 1908.
905,227.
Patented Dec. 1, 1908.
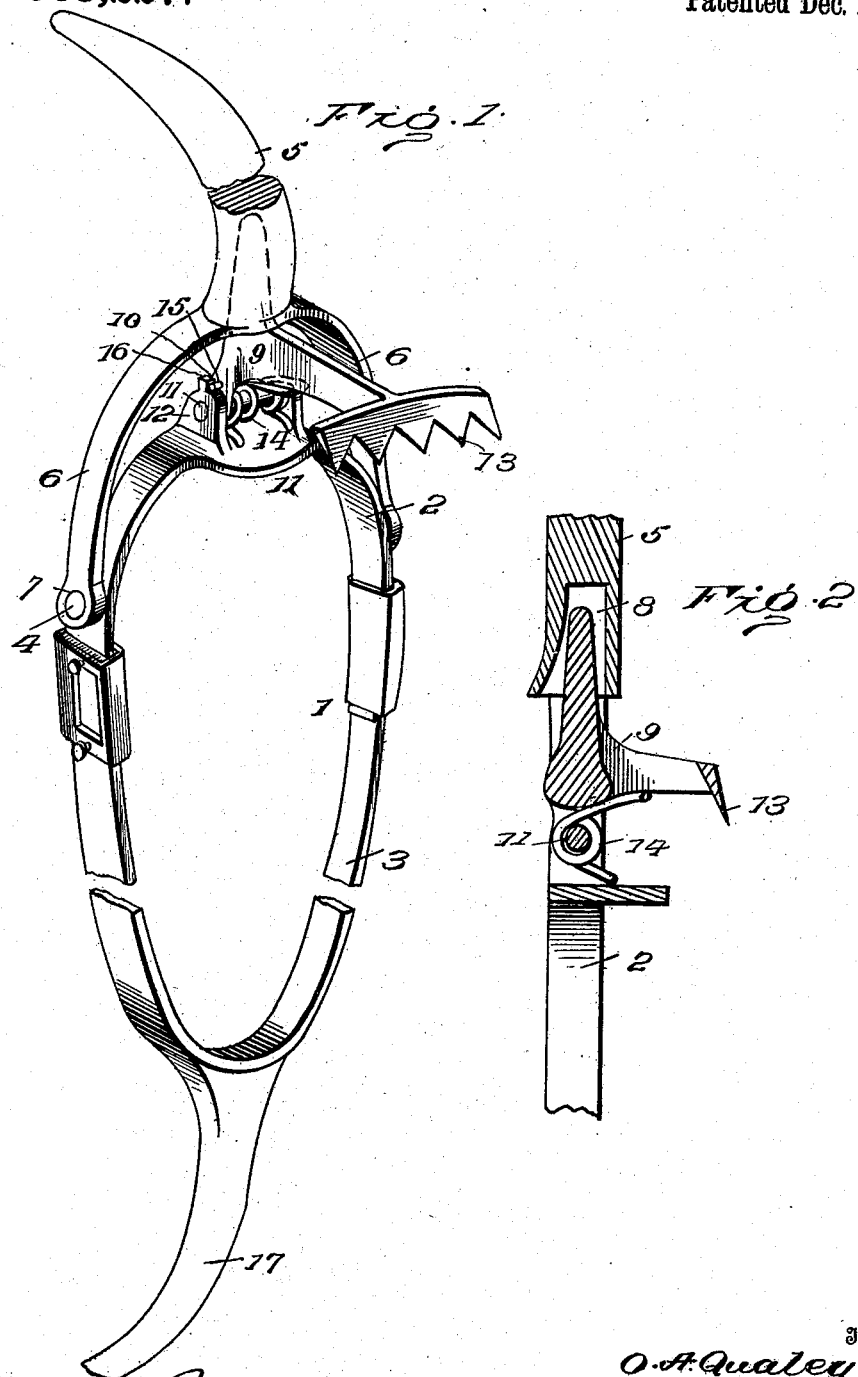
Witnesses
Inventor
O. A. Qualey
By
Attorneys

UNITED STATES PATENT OFFICE.

OLE ANDREW QUALEY, OF ELSBORO TOWNSHIP, MURRAY COUNTY, MINNESOTA.

ANIMAL-POKE.

No. 905,227.           Specification of Letters Patent.           Patented Dec. 1, 1908.

Application filed February 27, 1908. Serial No. 418,140.

*To all whom it may concern:*

Be it known that I, OLE ANDREW QUALEY, citizen of the United States, residing at Elsboro township, in the county of Murray and State of Minnesota, have invented certain new and useful Improvements in Animal-Pokes, of which the following is a specification.

The object of this invention is a simple, durable and efficient construction of an improved animal poke which may be readily applied to an animal and which is arranged to effectually prevent the latter from crawling through, jumping over or breaking down fences or the like, and thus prevents said animal from escaping or from injuring the inclosing fence.

With this and other objects in view that will more fully appear as the description proceeds, the invention consists in certain constructions and arrangements of the parts that I shall hereinafter fully describe and claim.

For a full understanding of the invention and the merits thereof, reference is to be had to the following description and the accompanying drawing in which—

Figure 1 is a perspective view of my improved poke; and, Fig. 2 is a detail view in section of the operative parts thereof.

Corresponding and like parts are referred to in the following description and indicated in all the views of the drawing by the same reference characters.

Referring to the drawing, the numeral 1 designates a collar which is preferably constructed in upper and lower sections 2 and 3 that are arranged to be suitably connected together to encircle the neck of an animal, the upper section 2 being formed near its opposite ends with two outwardly disposed lugs 4. An arm 5 is bifurcated at its lower end and the bifurcations 6 straddle the upper end of the collar and are formed at their extremities with eyes 7 by which they are mounted on the respective lugs 4 and thus pivotally connect the arm to the collar. This arm 5 extends upwardly from its bifurcated end and is preferably curved forwardly near its upper end, said arm being formed with a longitudinal socket 8 that communicates with the lower end of the arm between the bifurcations thereof. An elbow lever 9 is formed at its elbow with two outstanding ears 10 by means of which it is pivotally mounted on a cross-rod 11 supported above the upper end of the collar by two transversely spaced lugs 12 that are upwardly disposed from the latter. One arm of this lever extends upwardly into the socket 8 in the arm 5 and fits loosely in the same, while the other arm of the lever is preferably shorter than the arm 5 and extends rearwardly from the collar, said rear arm being laterally enlarged at its extremity and being formed with a plurality of rearwardly and downwardly facing prongs 13 which when the lever is in its normal position, are held in spaced relation to the neck of the animal. A spring 14 bears intermediate of its ends upon the collar 1, the ends of said spring being coiled around the cross-rod 11 as shown with their extremities rearwardly disposed and bearing against the rear arm of the lever 9 to hold the latter in normal position with its rear arm above the neck of the animal and its other arm in substantially vertical position. The front arm of the lever obviously serves to sustain the arm 5 in an upwardly extending position.

In the practical use of my improved poke, the arm 5 is forced backwardly upon an attempt of the animal to crawl through the fence, which manifestly rocks the elbow lever and presses the prongs thereof into the animal with considerable force on account of the leverage resulting from the relative lengths of the arm 5 and the rear arm of the lever. When the animal backs off from the fence the spring 14 returns the operative parts to their former positions.

The forward movement of the lever 9 and the arm 5 may be limited in any desired manner, for instance, a pin 15 may project from one of the ears 10 and abut against a stop 16 formed on the adjacent lug 12. In order to prevent the animal from jumping the fence, a second arm 17 is rigidly secured to the lower end of the collar and depends therefrom with its lower end preferably curved forwardly as shown.

Having thus described the invention, what I claim is:—

1. A poke comprising a collar, an arm pivotally connected to the collar, an elbow lever fulcrumed on the collar and connected at one end to the arm, the other end of the lever extending rearwardly from the collar, said arm being adapted to be swung rearwardly and downwardly, whereby to rock the lever and press the rear arm thereof against the animal, and a spring arranged to support the arm in an upright position.

2. A poke comprising a collar, an arm pivotally connected to the collar, an elbow lever fulcrumed on the collar and connected at one end to the arm, the other end of the lever extending rearwardly from the collar, said arm being adapted to be swung rearwardly and downwardly, whereby to rock the lever and press the rear arm thereof against the animal, and a spring interposed between the collar and the rear end of the lever to support the latter and yieldingly support the arm in an upright position.

3. A poke comprising a collar, an arm mounted on the collar and adapted to be swung rearwardly, said collar being formed with transversely spaced lugs, a cross-rod secured to and supported between the lugs, and an elbow lever formed at its elbow with outstanding ears journaled on the cross-rod, one end of the lever being connected to the arm, and the other end of the lever extending rearwardly from the collar, said rear end of the lever being arranged to be pressed against the animal upon the rearward movement of the arm.

4. A poke comprising a collar, an arm bifurcated at one end and having the bifurcations straddling the collar and pivotally connected thereto, said arm extending upwardly from such end, and being formed between the bifurcations with a downwardly opening socket, and an elbow lever fulcrumed on the collar with one end fitting loosely in the socket, the other end of the lever extending rearwardly.

5. A poke comprising a collar, an arm bifurcated at one end and having the bifurcations straddling the collar and pivotally connected thereto, said arm extending upwardly from such end and being formed between the bifurcations with a downwardly opening socket, an elbow lever fulcrumed on the collar with one end fitting loosely in the socket, the other end of the lever extending rearwardly from the collar, said arm being adapted to be swung rearwardly whereby to rock the lever and means for returning the lever and the arm to their normal positions.

In testimony whereof I affix my signature in presence of two witnesses.

OLE ANDREW QUALEY. [L. s.]

Witnesses:
    F. G. McKenzie,
    W. S. Davison.